United States Patent
Tigaev et al.

(10) Patent No.: US 11,921,399 B2
(45) Date of Patent: Mar. 5, 2024

(54) OPTICAL DEVICE COMPRISING ACHROMATIC PHASE DOUBLET, AND METHOD FOR DRIVING OPTICAL DEVICE WITH REDUCED CHROMATIC ABERRATION

(71) Applicant: Samsung Electronics Co., Ltd., Suwon-si (KR)

(72) Inventors: Vladislav Olegovich Tigaev, Moscow region (RU); Svetlana Vladimirovna Danilova, Moscow region (RU); Dmitriy Evgenyevich Piskunov, Moscow region (RU); Gavril Nikolaevich Vostrikov, Moscow region (RU); Nikolay Victorovich Muravev, Moscow region (RU); Mikhail Viacheslavovich Popov, Moscow region (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 17/742,991

(22) Filed: May 12, 2022

(65) Prior Publication Data
US 2022/0269143 A1    Aug. 25, 2022

Related U.S. Application Data

(63) Continuation of application No. PCT/KR2020/011841, filed on Sep. 3, 2020.

(30) Foreign Application Priority Data

Nov. 14, 2019   (RU) .......................... RU2019136631
Aug. 10, 2020   (KR) ........................ 10-2020-0100123

(51) Int. Cl.
G02F 1/29     (2006.01)
G02B 27/01    (2006.01)

(52) U.S. Cl.
CPC .......... *G02F 1/294* (2021.01); *G02B 27/0172* (2013.01); G02B 2027/011 (2013.01)

(58) Field of Classification Search
CPC ............... G02F 1/294; G02B 27/0172; G02B 2027/011
See application file for complete search history.

(56) References Cited

U.S. PATENT DOCUMENTS 5,886,822 A    3/1999   Spitzer
7,352,514 B2   4/2008   Hendriks et al.
(Continued)

FOREIGN PATENT DOCUMENTS

CN    102692781 A    9/2012
CN    108845382 A    11/2018
(Continued)

OTHER PUBLICATIONS

Cao et al., Investigation of optical testing with a phase-only liquid crystal spatial light modulator Optics Express, vol. 13, No. 4, pp. 1059-1065, Feb. 21, 2005.
(Continued)

*Primary Examiner* — Mariceli Santiago
(74) *Attorney, Agent, or Firm* — Jefferson IP Law, LLP

(57) ABSTRACT

An optical device including an achromatic phase doublet and a method of driving an optical device having reduced chromatic aberration is provided. The optical device includes an electroactive lens including an electroactive material layer, wherein the electroactive lens is configured to form a doublet phase function by applying a voltage to the (Continued)

electroactive material layer, the doublet phase function including a kinoform phase function and a harmonic lens phase function.

15 Claims, 14 Drawing Sheets

(56) References Cited

U.S. PATENT DOCUMENTS

| | | | |
|---|---|---|---|
| 8,167,427 | B2 | 5/2012 | Guillon et al. |
| 8,717,681 | B2 | 5/2014 | Griffith et al. |
| 8,885,139 | B2 | 11/2014 | Peyghambarian et al. |
| 9,164,206 | B2 | 10/2015 | Valley et al. |
| 9,354,451 | B2 | 5/2016 | Jeong et al. |
| 11,126,040 | B2 | 9/2021 | Yadin et al. |
| 2010/0202056 | A1 | 8/2010 | Moliton et al. |
| 2020/0033666 | A1* | 1/2020 | Li ............... G02C 7/083 |
| 2022/0214565 | A1 | 7/2022 | Van Heugten et al. |

FOREIGN PATENT DOCUMENTS

| | | | |
|---|---|---|---|
| CN | 112835259 | A * | 5/2021 |
| KR | 10-2007-0118594 | A | 12/2007 |
| KR | 10-2011-0104701 | A | 9/2011 |
| KR | 10-2018-0105707 | A | 9/2018 |
| RU | 2 186 417 | C2 | 7/2002 |
| RU | 2 355 006 | C2 | 5/2009 |
| RU | 94 352 | U1 | 5/2010 |

OTHER PUBLICATIONS

A. Marquez et al., Achromatic diffractive lens written onto a liquid crystal display, Optics Letters, vol. 31, No. 3, Feb. 1, 2006.
International Search Report with Written Opinion dated Dec. 16, 2020, issued in International Patent Application No. PCT/KR2020/011841.
Russian Search Report dated Jan. 9, 2020, issued in Russian Patent Application No. 2019136631.
Russian Decision on Grant dated Apr. 24, 2020, issued in Russian Patent Application No. 2019136631.
Russian Office Action dated Jan. 13, 2020, issued in Russian Patent Application No. 2019136631.

* cited by examiner

OPTICAL DEVICE COMPRISING ACHROMATIC PHASE DOUBLET, AND METHOD FOR DRIVING OPTICAL DEVICE WITH REDUCED CHROMATIC ABERRATION

CROSS-REFERENCE TO RELATED APPLICATION(S)

This application is a continuation application, claiming priority under § 365(c), of an International application No. PCT/KR2020/011841, filed on Sep. 3, 2020, which is based on and claims the benefit of a Russian patent application number 2019136631, filed on Nov. 14, 2019, in the Russian Intellectual Property Office, and of a Korean patent application number 10-2020-0100123, filed on Aug. 10, 2020, in the Korean Intellectual Property Office, the disclosure of each of which is incorporated by reference herein in its entirety.

BACKGROUND

1. Field

The disclosure relates to an optical system field. More particularly, the disclosure relates to an achromatic optical system having a variable focal length, which is particularly used not only in augmented reality or virtual reality (AR/VR) systems, tunable focus glasses, photo and video camera lenses, but also in various optical devices for research and application purposes.

2. Description of Related Art

For example, not only in currently developed optical systems for various application fields, such as augmented reality or virtual reality (AR/VR) systems, tunable focus glasses, or photo and video camera lenses, but in various optical devices for research and application purposes, electroactive diffraction lenses, in particular liquid crystal (LC) lenses or polymer gel-based lenses, are currently used. One of the problems of such lenses is that there is not only a dispersion of a refractive index of a lens material (liquid crystals or polymer gel), but chromatic aberration caused from a diffraction structure of lenses in use, that is, the refractive index of a material depends on the wavelength of optical radiation. The chromatic aberration is caused by different focal lengths to different radiation wavelengths and changes depending on the focal length of a lens. Furthermore, there are lateral (transverse) chromatic aberrations, also known as "zoom chromatic aberrations," that may be viewed as blurred "iridescent" bands around edges of focused objects and corrected by software, and axial chromatic aberrations, also known as "positional (=longitudinal) chromatic aberration," that may be viewed as "iridescent" halos around light spots in an image and corrected by software.

To improve image quality, it would be advantageous to remove (compensate for, correct) chromatic aberrations, in particular, axial chromatic aberrations (positional chromatic aberration) from an image. In the types of tunable lenses described above, the focal length may be adjusted by changing the phase function of an electroactive lens under the influence of a voltage applied to electrodes. Although optical power of the lenses may be changed by quite various methods, the methods do not participate in compensating for chromatic aberrations.

Furthermore, important tasks to improve the types of tunable lenses described above include reducing a lens response time, reducing a lens thickness, and reducing a voltage on electrodes needed to adjust a lens.

In the related art, a response time is generally reduced by reducing the thickness of a tunable lens and/or increasing a voltage on electrodes.

A reference document U.S. Pat. No. 8,717,681 B2 (BAE Systems PLC, issued on May 6, 2014) discloses an achromatic fluid optical system having a deformable membrane having a shape (curvature value) that is tunable by using piezoelectric actuators, and including two different liquids. The two different liquids used in the optical system may have different variance indices. The shortcomings of this method may include necessity of use of a mechanical adjustment means, a long response time, and a high operation voltage.

A reference document U.S. Pat. No. 7,352,514 B2 (Koninklijke Philips Electronics N. V., issued on Apr. 1, 2008) discloses an achromatic lens system based on the electrowetting effect, which includes two different non-mixed liquids, each liquid having an interface forming a meniscus and a shape that changes depending on an applied voltage, and in which a meniscus-forming interface layer between the two liquids has wettability by a first liquid. The shortcomings of this method may include a long response time, the size of an aperture limited by an inertia effect of the liquids in use, and a high operation voltage.

A reference document CN 108845382 A (Hangzhou Dianzi University, Nov. 20, 2018) discloses using a harmonics Alvarez diffraction lens in which focal lengths in a specific range are provided depending on lateral direction shift of lenses to each other, and the diffraction surfaces of two lenses reduce chromatic aberrations. The shortcomings of this method may include necessity of mechanical adjustment and large optical system dimensions.

A reference document doi.org/10.1364/OL.31.000392, achromatic diffraction lens written to a liquid crystal display, A. Marquez, et al, published on Feb. 1, 2006, proposes reducing chromatic aberrations by multiplexing phase functions to each wavelength in a liquid crystal display (LCD). The shortcomings of this method may include resultant insufficient image quality.

A reference document U.S. Pat. No. 9,164,206 B2 (University of Arizona, published on Oct. 20, 2015) discloses a solution for a system for achromatic variable focus lenses including a diffraction lens and a refraction lens. In this related-art solution, chromatic aberrations are reduced by combining a fluid lens with the diffraction lens that is a liquid crystal lens. The shortcomings of this related-art solution may include the necessity of mechanical adjustment of a fluid lens, a long response time, an aperture limited by inertia effects of a liquid, as well as a high operation voltage on electrodes. This related-art solution may be regarded as the closest analogue (prototype) to the claimed disclosure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an optical device including an achromatic phase doublet and a method of providing an optical device having reduced chromatic aberration.

Another aspect of the disclosure is to provide an achromatic lens having a variable focus.

Another aspect of the disclosure is to provide an optical system and method using an electroactive lens that, when used, achieves a technical result including reducing chromatic aberrations in an optical system. Furthermore, a shorter response time and a smaller thickness of an electroactive lens are achieved, and a voltage to be applied to the electroactive lens is reduced for an appropriate response time.

Additional aspects will be set forth in part in the description which follows and, in part, will be apparent from the description, or may be learned by practice of the presented embodiments.

In accordance with an aspect of the disclosure, an optical device is provided. The optical device includes an electroactive lens including an electroactive material layer, wherein the electroactive lens may be configured to form a doublet phase function by applying a voltage to the electroactive material layer, the doublet phase function including a kinoform phase function and a harmonic lens phase function.

The harmonic lens phase function may be an integer multiple of the kinoform phase function.

The kinoform phase function may be a phase function having a maximum phase of $2\pi$ radians, the harmonic lens phase function may be a phase function having a maximum phase of $2\pi N$ (N may be an integer of 2 or more), and the doublet phase function may be formed by a combination of the kinoform phase function and the harmonic lens phase function and may be a phase function having a maximum phase of $2\pi+2\pi N$.

N may be an integer of 2 to rounded downward ($kt\Delta n/2\pi-1$), k may be a wave number, t may be a lens thickness, and $\Delta N$ may be optical anisotropy.

The electroactive lens may be a tunable electroactive lens, and the electroactive lens may be configured to adjust a focal length by changing a voltage applied to the electroactive material layer of the electroactive lens.

The electroactive lens may be a liquid crystal (LC) lens.

The electroactive lens may be a polymer gel-based lens.

The electroactive material layer includes a plurality of independent cells stacked in an optical propagation path, each of the plurality of independent cells having a phase function amplitude of $2\pi$.

The electroactive lens includes a first electroactive lens that reproduces the kinoform phase function and a second electroactive lens that reproduces the harmonic lens phase function, and the first electroactive lens and the second electroactive lens may be arranged along the optical propagation path without an interval therebetween.

The optical device includes a static lens, wherein the electroactive lens may be configured to reproduce any one of the kinoform phase function and the harmonic lens phase function, and the static lens may be configured to reproduce the other of the kinoform phase function and the harmonic lens phase function.

The optical device includes a static lens that provides an additional optical power adjustment.

In accordance with another aspect of the disclosure, an augmented reality system is provided. The augmented reality system includes a waveguide, a display disposed to face one side edge of a first surface of the waveguide, a first achromatic phase doublet disposed between the first surface of the waveguide and the display, a second achromatic phase doublet disposed at the other edge of a second surface opposite to the first surface of the waveguide, and a third achromatic phase doublet disposed to face the second achromatic phase doublet with the waveguide therebetween. The first and second achromatic phase doublets may be an optical device having the above-described configuration.

In accordance with another aspect of the disclosure, a method of driving an optical device having reduced chromatic aberrations, the optical device including an electroactive lens including an electroactive material layer is provided. The method includes obtaining an optical power of a kinoform, obtaining an optical power of a harmonic lens, obtaining a kinoform phase function having a maximum phase of $2\pi$ radians, obtaining a harmonic lens phase function having a maximum phase of $2\pi N$ radians, wherein N may be an integer greater than 1, combining the harmonic lens phase function with the kinoform phase function to obtain a doublet phase function, and applying a voltage to the electroactive material layer of the electroactive lens to implement the doublet phase function.

In accordance with another aspect of the disclosure, a computer-readable medium stores instructions, when executed by a processor, to cause the processor to perform the above-described method is provided.

In other aspects, the disclosure may also be not only for an optical system including the optical device, but for one or more electroactive lenses, image forming methods and optical devices, computer programs and program products, and a computer-readable medium.

According to the disclosed embodiments, a variable focus lens having no chromatic aberration by using electroactive lenses may be provided. Furthermore, according to the disclosed embodiments, a response time, a thickness, and an applied voltage of a variable focus lens may be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
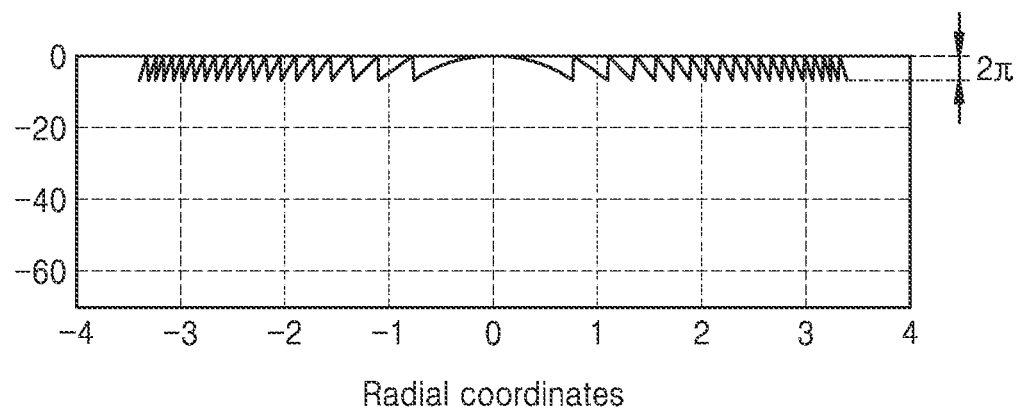
FIG. 1 is a graph of a kinoform phase function according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, as those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, when a constituent element is disposed "above" or "on" to another constituent element, the constituent element may be only directly on the other constituent element or above the other constituent elements in a non-contact manner. It will be further understood that the terms "comprises" and/or "comprising" used herein specify the presence of stated features or components, but do not preclude the presence or addition of one or more other features or components.

The use of the terms "a" and "an" and "the" and similar referents in the context of describing the disclosure (especially in the context of the following claims) are to be construed to cover both the singular and the plural. Also, the steps of all methods described herein can be performed in any suitable order unless otherwise indicated herein or otherwise clearly contradicted by context. The disclosure is not limited to the described order of the steps.

Furthermore, terms such as " . . . portion," " . . . unit," " . . . module," and " . . . block" stated in the specification may signify a unit to process at least one function or operation and the unit may be embodied by hardware, software, or a combination of hardware and software.

Furthermore, the connecting lines, or connectors shown in the various figures presented are intended to represent functional relationships and/or physical or logical couplings between the various elements. It should be noted that many alternative or additional functional relationships, physical connections or logical connections may be present in a practical device.

The use of any and all examples, or language (e.g., "such as") provided herein, is intended merely to better illuminate the disclosure and does not pose a limitation on the scope of the disclosure unless otherwise claimed.

To improve image quality, it would be advantageous to remove (compensate for, correct) chromatic aberrations, in particular, axial chromatic aberrations (positional chromatic aberration), from an image.

Furthermore, important tasks to improve the above-mentioned types of tunable lenses include reducing a response time of a lens, reducing the thickness of a lens, and reducing a voltage needed in electrodes to adjust a lens.

A response time of an electroactive lens is known to be proportional to the square of the thickness of the lens. For a tunable electroactive lens, in particular, a liquid crystal (LC) lens, a response time is calculated by the following Equation 1:

$$\tau_\Sigma = \frac{\gamma_1 t^2}{\epsilon_0 \Delta\epsilon \left(V_{on}^2 - V_{th}^2\right)} + \frac{\gamma_1 t^2}{\epsilon_0 \Delta\epsilon V_{th}^2} \qquad \text{Equation 1}$$

The main parameters that characterize an LC lens are t that is the thickness of a liquid crystal lens and $V_{on}$ that is an applied voltage.

For various application fields of a tunable electroactive lens having removed (compensated for) chromatic aberration, in particular, when the lens is used in AR systems, it would be advantageous to achieve the following effects:

a shorter response time ($\tau\Sigma$), a smaller lens thickness (t), and a lower applied voltage ($V_{on}$).

To achieve the above-described purpose, proposed is a "doublet" consisting of phase functions of two lenses, that is, a kinoform and a harmonic lens. The phase functions of a kinoform and a harmonic lens are different from those of a conventional lens in that the former has a phase modulation of a $2\pi$ (or $2\pi N$) level, which enables reducing the thickness of a material.

The disclosure implements a "doublet" of two phase functions, for example, in one tunable electroactive lens that may have the form of a tunable liquid crystal (LC) lens or a tunable polymer gel-based lens. It should be noted that the above-described lens types are mentioned as examples only, and that other types of materials and mechanical means may become apparent to a person skilled in the art in the related field suitable for implementing the disclosure. By using only one tunable electroactive lens, the necessity of mechanical means for adjusting an optical system is removed, a necessary operation voltage is reduced, and while reducing chromatic aberrations, a response time of a tunable electroactive lens is reduced. In one embodiment of the disclosure, the about 0.3 mm thickness of a tunable electroactive lens may be achieved.

A method of providing the "doublet" of phase functions according to the claimed disclosure is described below. According to the disclosure, a tunable electroactive lens provides an "achromatic phase doublet" by obtaining and combining phase functions having characteristics for two lenses, that is, a kinoform and a harmonic lens. Moreover, balance between the optical power of a kinoform and the optical power of a harmonic lens is achieved, which enables removing (compensating for) or at least reducing chromatic aberrations.

According to the method of the disclosure, the optical powers of a kinoform and a harmonic lens, phase functions of which form the "doublet", are obtained with respect to a phase function "doublet" implemented by a tunable electroactive lens according to the disclosure. Although the disclosure discusses herein an example of a tunable electroactive lens in the form of a liquid crystal (LC) lens, the disclosure is not limited to the use of an LC lens, and in an alternative example, a tunable electroactive lens may be in the form of, for example, a polymer gel-based lens.

The maximum optical power of a lens system including two lenses is obtained by summing the optical powers of the two lenses. In an example optical system including a kinoform and a harmonic lens, the maximum optical power may be calculated by using the following Equation 2:

$$D_0 = D_k + D_h \quad \text{Equation 2}$$

D0 denotes the maximum optical power, Dk denotes the optical power of a kinoform, and Dh denotes the optical power of a harmonic lens.

In this state, the achromatic condition (the absence of chromatic aberrations) of lenses to the "system" is as follows:

$$\frac{V_k}{D_k} + \frac{V_h}{D_h} = 0 \quad \text{Equation 3}$$

Vk denotes the Abbe number to the kinoform, and Vh denotes the Abbe number to the harmonic lens.

When simultaneous equations consisting of the two equations provided above are solved, the optical power for the kinoform may be calculated as follows:

$$D_k = D_0 \frac{V_k}{V_k - V_h} \quad \text{Equation 4}$$

The optical power to the harmonic lens is calculated as follows:

$$D_h = D_0 \frac{V_h}{V_h - V_k} \quad \text{Equation 5}$$

When a liquid crystal (LC) material E7 is regarded as a material for a tunable electroactive lens, and a maximum optical power D0 of 4 diopters (dpt) is given, the optical powers Dk and Dh to the kinoform and the harmonic lens may be 1.3 dpt and 2.7 dpt, respectively. It is noted that these values are used only as typical example for describing the disclosure, and that these values do not correspond to a case intended to limit the scope of the disclosure to specific values.

When a new tunable electroactive lens is necessary to implement the claimed disclosure, a lens thickness suitable for realizing an optical system with the above calculated characteristics may be derived. It is noted that the disclosure may also be implemented using an existing tunable electroactive lens that is appropriately tunable by applying a necessary voltage value depending on the thickness of an existing lens, the properties of the electroactive material, etc.

It is noted that the short response time of a tunable electroactive lens, that is, a fast adjustment of the optical power, may be achieved by decreasing the lens thickness and/or increasing the applied voltage. When a tunable electroactive lens is taken as a non-limiting detailed example and used in the field of AR systems, a response time $\tau\Sigma$ of 0.9 seconds and an applied voltage value V of 10 V may be used as input parameters to calculate the lens thickness. As an example of an electroactive material of a lens, the material E7 having the following characteristics may be taken:

$\gamma 1 = 186$ MPa·sec − rotation viscosity of liquid crystals $K33 = 18 \cdot 10^{-12} N$ − Frank's elasticity coefficient $\varepsilon 0 = 8.85 \cdot 10^{-12}$ F/m − permittivity (electric constant)

$\Delta \varepsilon = 13.8$ − dielectric anisotrophy of liquid crystals

A threshold voltage Vth is calculated according to the following equation:

$$V_{th} = \pi \sqrt{\frac{K_{33}}{\epsilon_0 \Delta \epsilon}} \quad \text{Equation 6}$$

The threshold voltage is 1.2 V based on the characteristics provided above.

For the purpose of calculating the essential thickness of a tunable liquid crystal lens, a response time consists of a relaxation time and a liquid crystals realignment time as follows:

$$\tau_\Sigma = \tau_{on} + \tau_{off} \quad \text{Equation 7}$$

$\tau_{on}$ denotes a liquid crystals realignment time, and $\tau_{off}$ denotes a relaxation time.

The liquid crystals realignment time is calculated according to the following equation:

$$\tau_{on} = \frac{T_{off}}{\left|\left(\frac{V_{on}}{V_{th}}\right)^2 - 1\right|} \quad \text{Equation 8}$$

The relaxation time is calculated as follows:

$$\tau_{off} = \frac{\gamma_1 t^2}{\epsilon_0 \Delta \epsilon V_{th}^2} \qquad \text{Equation 9}$$

Accordingly, the response time is as follows:

$$\tau_\Sigma = \frac{\tau_{off}}{\left|\left(\frac{V_{on}}{V_{th}}\right)^2 - 1\right|} + \tau_{off} \qquad \text{Equation 10}$$

A lens thickness t is calculated according to the following equation:

$$t = \sqrt{\frac{\tau_\Sigma \epsilon_0 \Delta \epsilon V_{th}^2 / \gamma_1}{\frac{1}{\left|\left(\frac{V_{on}}{V_{th}}\right)^2 - 1\right|} + 1}} \qquad \text{Equation 11}$$

For the above-mentioned parameters used as non-limiting examples, the lens thickness t is 31 μm.

A kinoform phase function and a harmonic lens phase function are respectively obtained with respect to the optical power values of a kinoform and a harmonic lens as calculated above. The kinoform phase function is illustrated in FIG. 1, and the harmonic lens phase function is illustrated in FIG. 2.

FIG. 1 is a graph of a kinoform phase function according to an embodiment of the disclosure.

Figure 2:
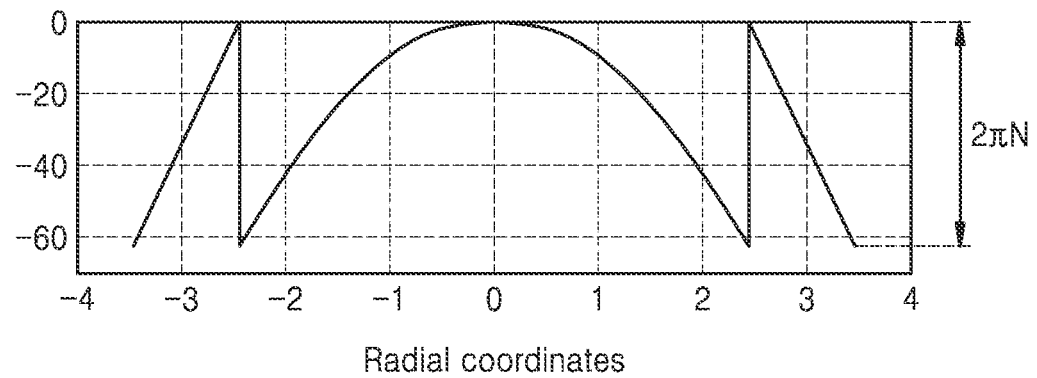
FIG. 2 is a graph of a harmonic lens phase function according to an embodiment of the disclosure.

FIG. 2 is a graph of a harmonic lens phase function according to an embodiment of the disclosure.

Referring to FIGS. 1 and 2, the harmonic lens phase function may have the form that is an integer multiple of the kinoform phase function.

The harmonic lens phase function is obtained starting from a lens thickness that is calculated or known under the conditions of providing a quick adjustment of the optical power of a lens, that is, a short response time of a tunable electroactive lens. The maximum phase of a harmonic lens phase function is $2\pi N$ radians, where N is an integer of 2 or more (N=2, 3, ... ).

The harmonic lens phase function is calculated according to the following equation:

$$\varphi_{harmonic} = \left[-\frac{2\pi r^2}{\lambda 2} D_h\right] \text{mod}_{2\pi N} \qquad \text{Equation 12}$$

By applying the thickness t of 31 μm as calculated above to a doublet phase function having the maximum phase of $2\pi + 2\pi N$, and considering a Dh value of 2.7 dpt as calculated above, the following Equation 13 may be obtained:

$$t = \frac{\phi}{\frac{2\pi}{\lambda}\Delta n} = \frac{2\pi(N+1)}{\frac{2\pi}{\lambda}\Delta n} \qquad \text{Equation 13}$$

Δn denotes optical anisotropy (refractive index anisotropy) of liquid crystals taken to be 0.21 as a non-limiting example, and λ denotes a basic wavelength taken to be 0.588 μm as a non-limiting example.

Based on the above description, a value of N with respect to the harmonic lens phase function may be calculated according to the following Equation 14:

$$N = \frac{t\Delta n}{\lambda} - 1 \qquad \text{Equation 14}$$

In other words, N with respect to the harmonic lens phase function is a rounded downward integer of $(kt\Delta n/2\pi - 1)$. k denotes a wave number $2\pi/\lambda$. Considering the above-mentioned parameters, N is the same as 10, that is, $2\pi N = 20\pi$ (see FIG. 2). It is noted that the above-mentioned parameters are mentioned only as non-limiting examples and are not intended to limit the scope of the claimed disclosure by specific values. The parameters may vary depending on the types and properties of the selected electroactive material, the thickness of a tunable electroactive lens, the necessary maximum optical power of a tunable electroactive lens, and the like.

The kinoform phase function (maximum phase of $2\pi$ radians) is also intended to provide a quick adjustment of the optical power of a lens.

The kinoform phase function is calculated according to the following Equation 15:

$$\varphi_{kinoform} = \left[-\frac{2\pi r^2}{\lambda 2} D_k\right] \text{mod}_{2\pi} \qquad \text{Equation 15}$$

As the obtained kinoform phase function and harmonic lens phase function are combined with each other, a "doublet" phase function is obtained. By combining the phase functions, provided is a "doublet" phase function having the same phase value as the sum of phase values with respect to a harmonic lens and a kinoform (which is the same as $2\pi + 20\pi = 22\pi$ radians in a considered non-limiting example), and having the maximum optical power that is the same as the sum of the optical powers of a harmonic lens and a kinoform (which is the same as 1.3 dpt+2.7 dpt=4 dpt in a considered non-limiting example). Combining the harmonic lens phase function and the kinoform phase function allows to eliminate material dispersion, which is characteristic for harmonic lens, with diffraction dispersion of the kinoform, as a result of which chromatic aberration of the harmonic lens and the chromatic aberration of the kinoform substantially sum up in a minimal (residual) chromatic aberration. Profiles of the harmonic lens phase function and the kinoform phase function have inclinations of dispersion curves (dependency between the optical power and the wavelength) opposite to each other, and when the harmonic lens phase function is combined with the kinoform phase function, a residual optical power adjustment (a change in the optical power depending on the wavelength) occurs (see the graph of FIG. 6).

Figure 6:
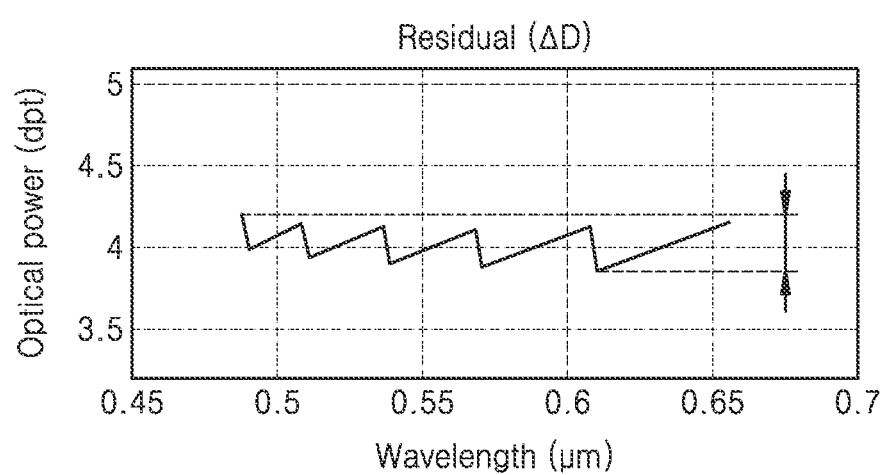
FIG. 6 is a graph of a residual modulation of optical power (chromatic aberration) showing an example of a minimum chromatic aberration achieved in a tunable electroactive lens according to an embodiment of the disclosure.

FIG. 6 is a graph of a residual modulation of optical power (chromatic aberration) showing an example of a minimum chromatic aberration achieved in a tunable electroactive lens according to an embodiment of the disclosure.

The above-mentioned residual optical power adjustment causes chromatic aberrations, in particular axial direction aberrations ("positional chromatic aberration"). When the phase functions are combined according to the disclosure, a very small residual optical power adjustment occurs, and thus, compared to the related-art technical solutions, very low chromatic aberrations occur.

Meanwhile, considering the following Equation 16:

$$\Delta D = \frac{D_0}{N+1}$$ Equation 16

Here, $\Delta D$ denotes a residual optical power adjustment (chromatic aberration), D0 denotes a maximum optical power, and as a value N increases, resultant chromatic aberrations are reduced in a given optical system. However, an increase in the value N causes an increase in the thickness of a tunable electroactive lens, which finally adversely affects the response time.

The minimum chromatic aberrations with respect to a tunable lens having the parameters discussed above may be removed as follows.

The value N to a harmonic lens phase function ($2\pi N$) may be given as in Equation 14.

For example, when N is the same as 10 and D0 is 4 dpt, the minimum chromatic aberrations ("positional chromatic aberration") with respect to a tunable electroactive lens having the parameters discussed above become 0.36 dpt. The minimum chromatic aberration values are substantially defined by the balance among the maximum optical power of a lens, a lens thickness, and a response time.

The obtained "doublet" phase function is implemented in a new tunable electroactive lens in which the necessary parameters, in particular a thickness or a phase profile, are calculated as described above, or in an existing tunable electroactive lens by applying necessary voltage values. To apply a voltage, it is necessary to calculate a voltage to be applied to electrodes that act on the electroactive material of a lens (for example, to control liquid crystals in a liquid crystal (LC) electroactive lens). To this end, a voltage map for electrodes of a tunable electroactive lens is formed. The voltage map is calculated based on the voltage-phase characteristics of an electroactive material of a tunable electroactive lens. The dependencies between the voltage and the phase and the use of the dependencies in the "doublet" phase function are exemplarily illustrated in FIGS. 3 to 5.

Figure 3:
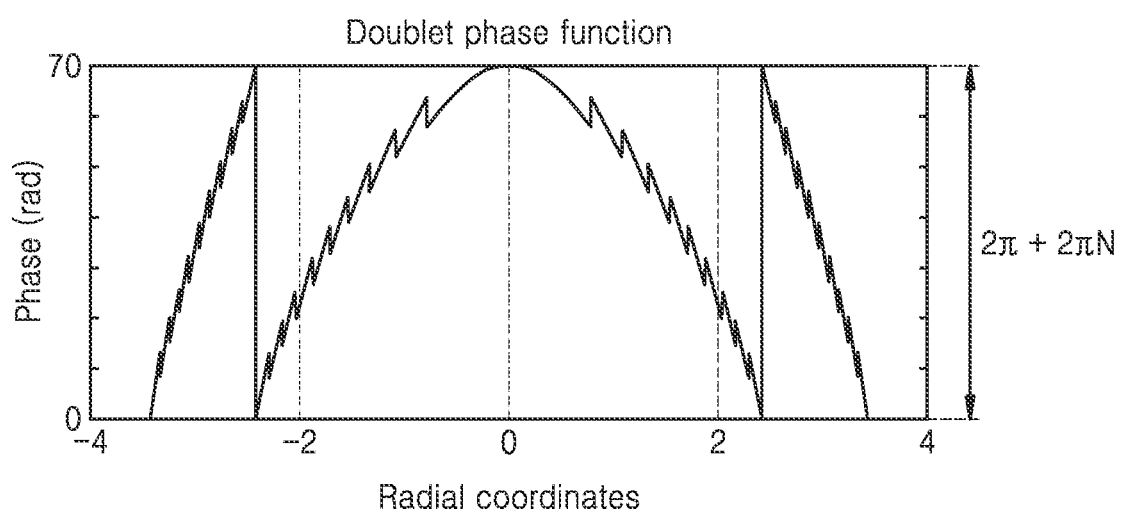
FIG. 3 is a graph of an achromatic phase doublet phase function according to an embodiment of the disclosure.

FIG. 3 is a graph of an achromatic phase doublet phase function according to an embodiment of the disclosure.

Figure 4:
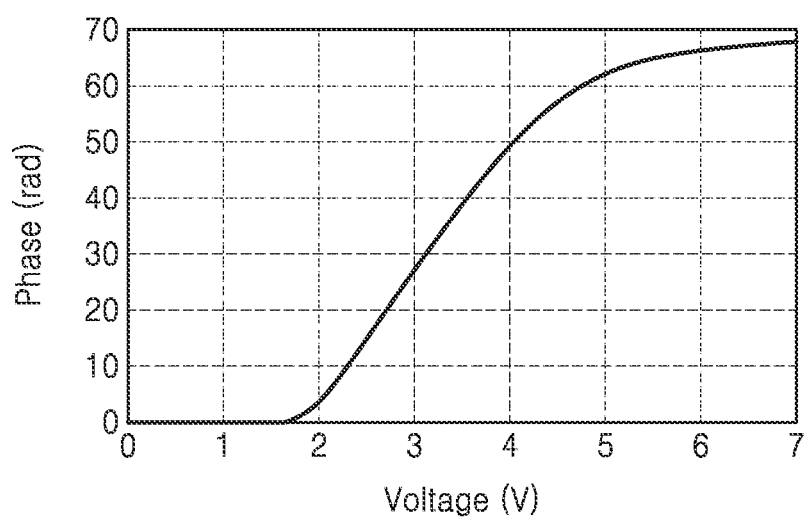
FIG. 4 is a graph of voltage-phase characteristics of an electroactive material according to an embodiment of the disclosure.

FIG. 4 is a graph of voltage-phase characteristics of an electroactive material according to an embodiment of the disclosure.

Figure 5:
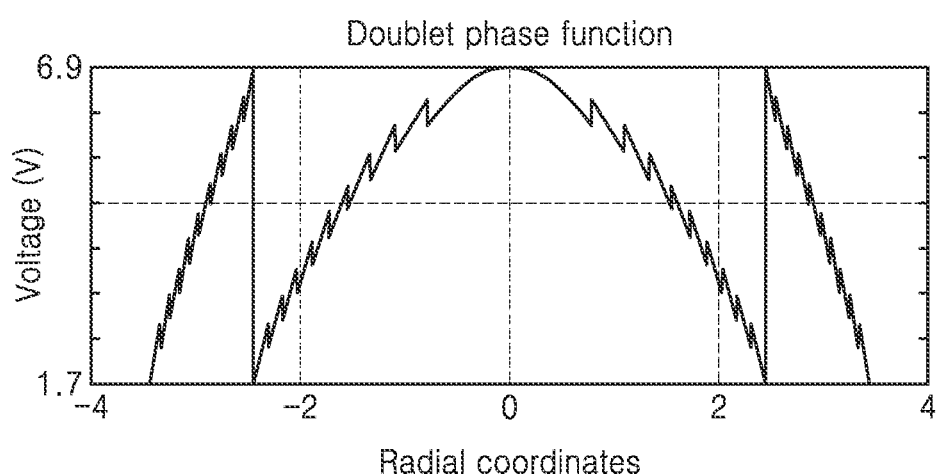
FIG. 5 is a graph of a voltage distribution according to an aperture for an achromatic phase doublet according to an embodiment of the disclosure.

FIG. 5 is a graph of a voltage distribution according to an aperture for an achromatic phase doublet according to an embodiment of the disclosure.

For example, when the voltage-phase characteristics of an electroactive material is identical to the graph of FIG. 4, a voltage map to obtain the doublet phase function shown in FIG. 3 may be the same as FIG. 5.

For an existing lens, the voltage-phase characteristics may be measured by various methods that are well known from the related-art technology (for example, see Chen R. H. Liquid Crystal Displays: Fundamental Physics and Technology.—John Wiley & Sons, 2011, or Den Boer W. Active Matrix Liquid Crystal Displays: Fundamentals and Applications.—Elsevier, 2011). Then, a voltage function profile is determined with respect to the "doublet" phase function based on the measured voltage-phase characteristics (see FIG. 5), and then, the obtained voltage function profile is applied to a tunable electroactive lens by applying a voltage to an electrode for controlling an electroactive lens according to a "voltage map" corresponding to the obtained voltage function profile.

Figure 7:
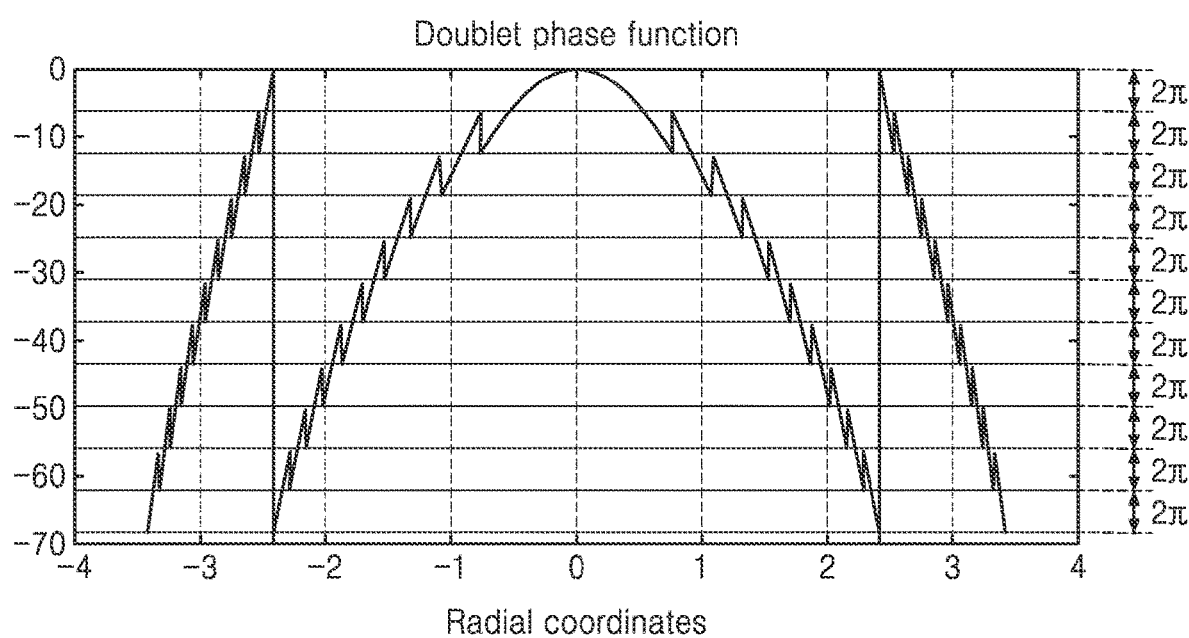
FIG. 7 is a graph of an achromatic phase doublet phase function according to an embodiment, in which a tunable electroactive lens is implemented as a stack of tunable optical cells according to an embodiment of the disclosure.
Figure 8:
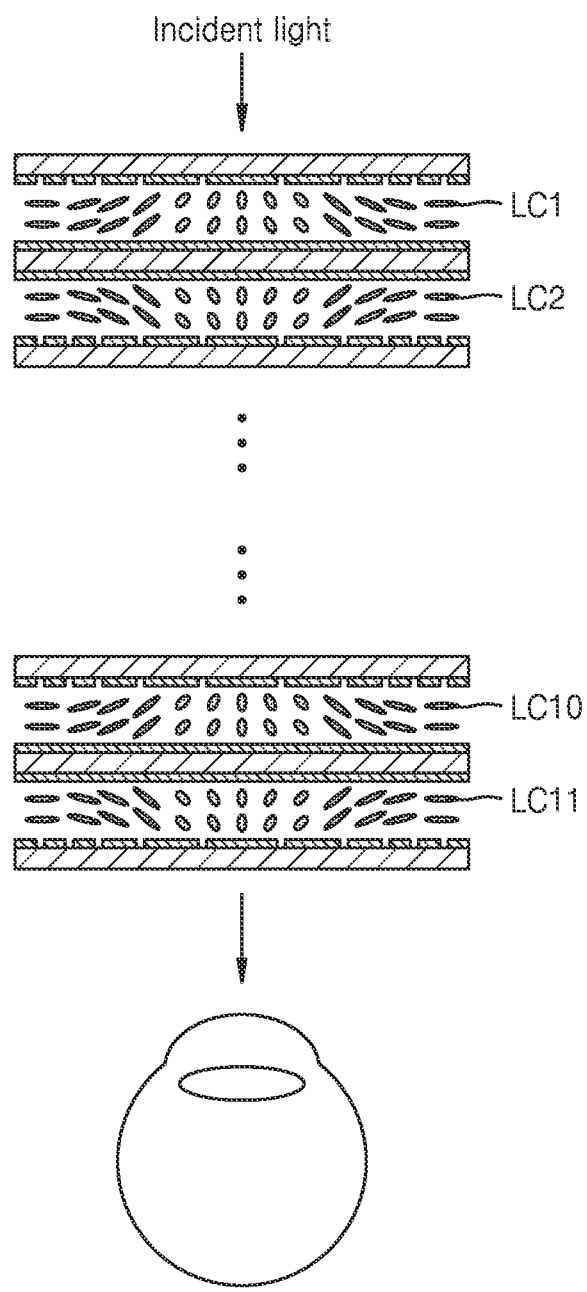
FIG. 8 illustrates a stack structure of tunable optical cells to implement an achromatic phase doublet phase function of FIG. 7 according to an embodiment of the disclosure.

As one of the possible embodiments of the disclosure, in an optical system in which chromatic aberrations are compensated for, by implementing a tunable electroactive lens in the stack form of LC cells in which a very large amplitude ($22\pi$) of the doublet phase function is divided into eleven independent liquid crystal (LC) cells LC1, LC2, ..., LC10, and LC11, each having a phase function amplitude of $2\pi$, as an non-limiting example as illustrated in FIGS. 7 and 8, a response time may be further shortened (an operation speed may increase).

FIG. 7 is a graph of an achromatic phase doublet phase function in which a tunable electroactive lens is implemented as a stack of tunable optical cells according to an embodiment of the disclosure.

FIG. 8 illustrates a stack structure of the tunable optical cells LC1, LC2, ..., LC10, and LC11 to implement an achromatic phase doublet phase function of FIG. 7 according to an embodiment of the disclosure. The LC cells LC1, LC2, ..., LC10, and LC11 may be stacked along an optical propagation path.

Referring to FIGS. 7 and 8, the phase function amplitude may be reduced 11 times, which may reduce the response time of an optical system proportional to the square of the thickness of one lens, and thus, the response time may be reduced 121 times. Meanwhile, the total thickness of a stack structure may be about 3.3 mm based on the parameters provided above, as a non-limiting example, which is generally suitable for most application fields of the claimed disclosure, in particular application fields of an AR system. Here, the number of LC cells LC1, LC2, ..., LC10, and LC11 is merely an example, and it is possible to stack a different number of LC cells. Furthermore, although FIG. 8 illustrates, as an example, the LC cells LC1, LC2, ..., LC10, and LC11, a plurality of cells of polymer gel may be stacked instead of LC cells.

Within a legal protection scope of the disclosure, an achromatic phase "doublet" may not be implemented as an electroactive lens based on a liquid crystal electroactive material or polymer gel, but may be implemented even in a static lens in the form of optical glass. In this case, the static lens may be manufactured with a profile that physically reproduces a "doublet" profile of a kinoform and a harmonic lens. In this case, a lens thickness may be calculated according to the following Equation 17:

$$t = \frac{\phi}{\frac{2\pi}{\lambda}n} = \frac{2\pi N}{\frac{2\pi}{\lambda}n} = \frac{\lambda N}{n}$$ Equation 17

As a non-limiting example, the thickness of a lens may be about 3.3 mm based on the parameters, as an example, (the maximum optical power of 4 dpt, N=11) provided above, which may also be suitable for the application of the lens to various optical systems in the technical field to which the disclosure pertains, and also the technical effect of removing chromatic aberrations, in particular "positional chromatic aberrations," may also be achieved with respect to the lens.

Figure 9:
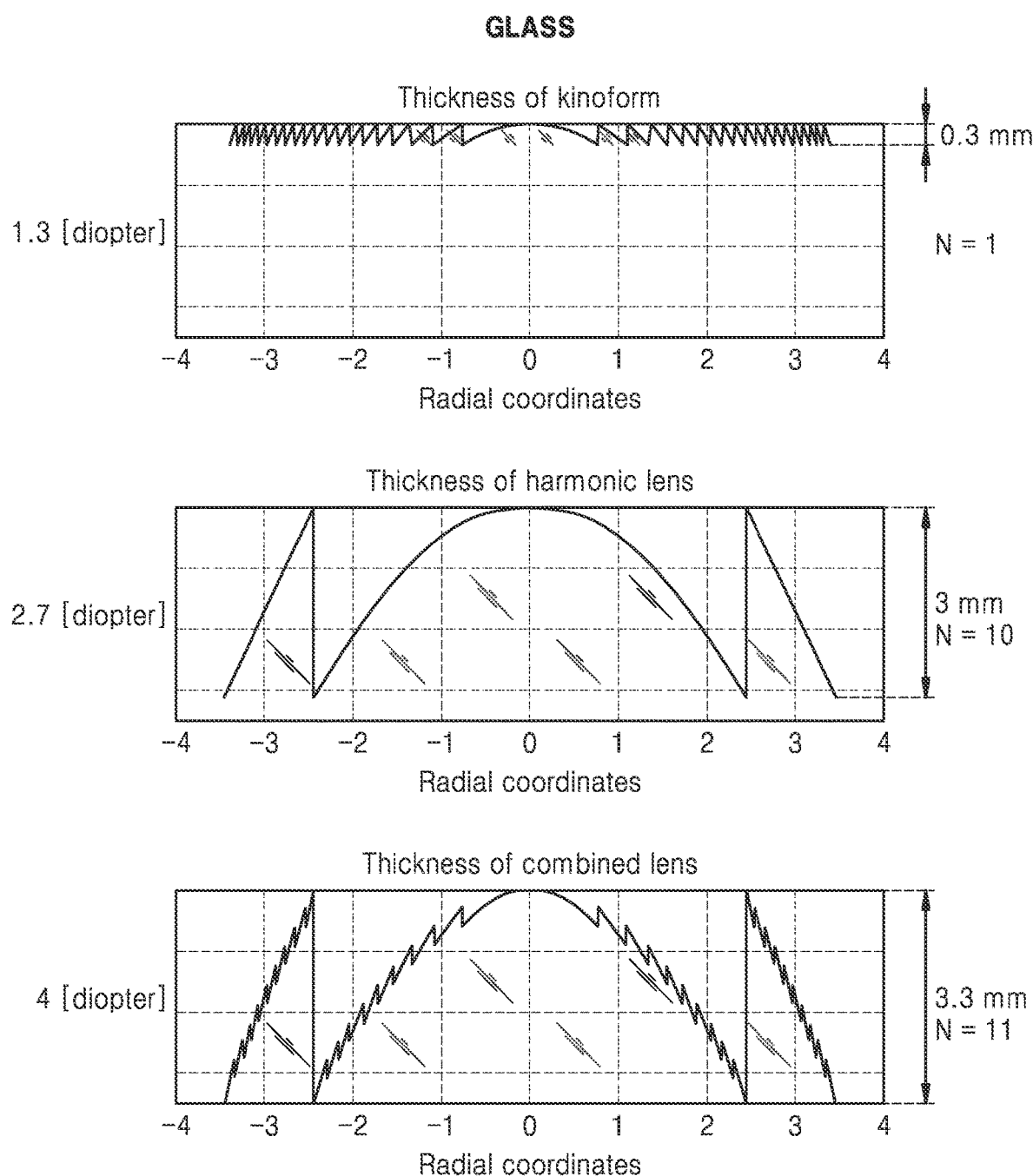
FIG. 9 shows graphs of a kinoform phase function, a harmonic lens phase function, and an achromatic phase doublet phase function, to implement a static lens by using optical glass according to an embodiment of the disclosure.

FIG. 9 shows graphs of a kinoform phase function, a harmonic lens phase function, and the achromatic phase doublet phase function, to implement a static lens by using optical glass according to an embodiment of the disclosure.

Referring to FIG. 9, an achromatic phase doublet may be formed by two tunable electroactive lenses in which one reproduces a kinoform phase function and the other reproduces a harmonic lens phase function. In the embodiment, lenses are arranged one-by-one on an optical radiation propagation path, in particular without an air gap between the lenses.

Figure 10:
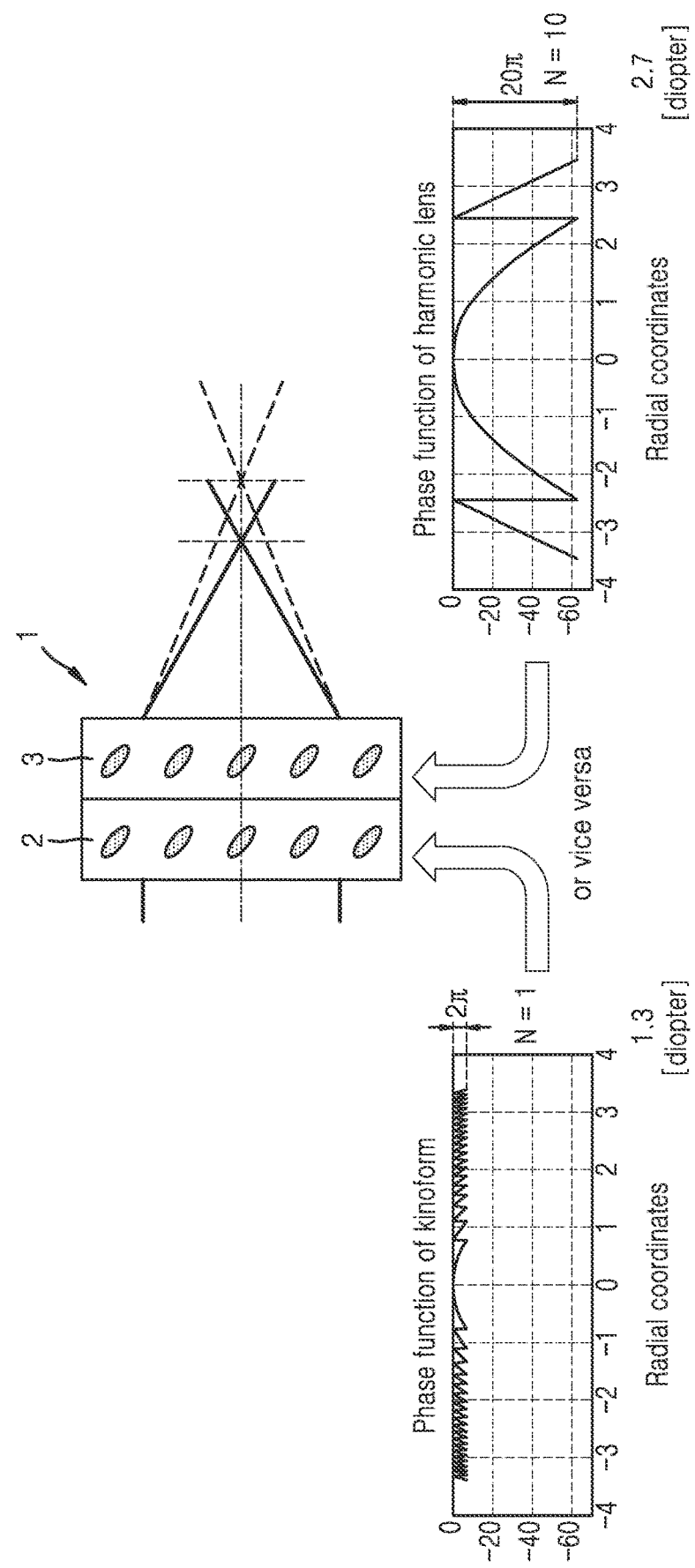
FIG. 10 schematically illustrates a structure of an achromatic phase doublet according to an embodiment of the disclosure.

FIG. 10 schematically illustrates a structure of an achromatic phase doublet 1 according to an embodiment of the disclosure.

Referring to FIG. 10, the achromatic phase doublet 1 includes a first tunable electroactive lens 2 and a second tunable electroactive lens 3. The first tunable electroactive lens 2 and the second tunable electroactive lens 3 may be arranged along an optical radiation propagation path without an interval therebetween. One of the first tunable electroactive lens 2 and the second tunable electroactive lens 3 may reproduce a kinoform phase function, and the other may reproduce a harmonic lens phase function. The achromatic phase doublet 1 may be an achromatic lens having a variable focus.

In another embodiment, the achromatic phase doublet may be formed by a combination of a tunable electroactive lens and a static lens. In this case, the tunable electroactive lens and the static lens are sequentially arranged on an optical radiation propagation path, and one of the tunable electroactive lens and the static lens may implement a kinoform phase profile and the other may implement a harmonic lens phase profile. The embodiment may be advantageous for some application fields of an optical system that is discussed, as a non-limiting example, such as a lens of a telescope or binoculars. However, in the embodiment, while minimum chromatic aberrations may be achieved only for one optical power value (only one focal length), when the optical system is adjusted with different optical power values, increase of chromatic aberrations follows.

Figure 11:
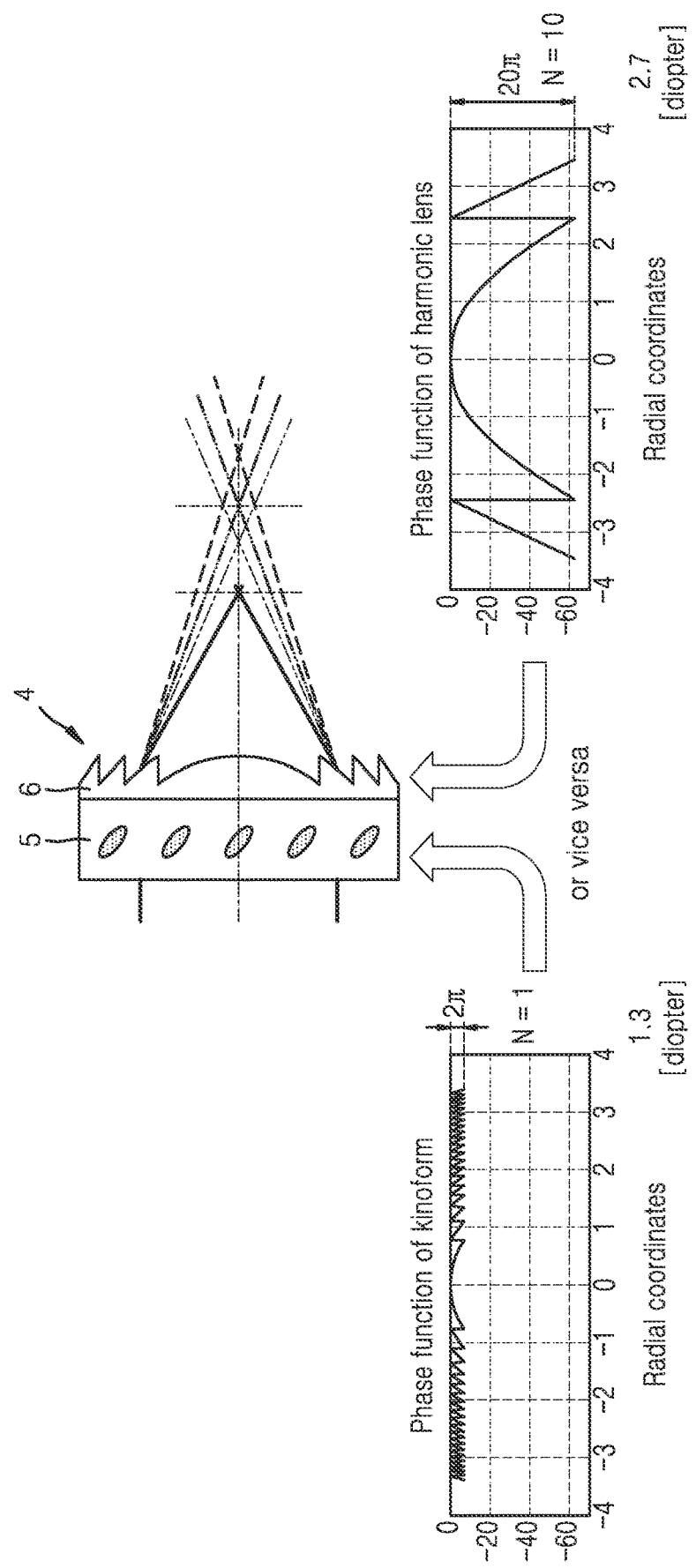
FIG. 11 schematically illustrates a structure of an achromatic phase doublet according to an embodiment of the disclosure.

FIG. 11 schematically illustrates a structure of an achromatic phase doublet 4 according to an embodiment of the disclosure.

Referring to FIG. 11, the achromatic phase doublet 4 includes a tunable electroactive lens 5 and a static lens 6. The tunable electroactive lens 5 and the static lens 6 may be arranged along an optical radiation propagation path without an interval therebetween. One of the tunable electroactive lens 5 and the static lens 6 may reproduce a kinoform phase function, and the other may reproduce a harmonic lens phase function. The static lens 6 may be formed of, for example, glass.

In another embodiment, the optical system may include a combination of a tunable electroactive lens and a static lens that provides an additional adjustment of optical power. In the embodiment, a tunable electroactive lens may implement, as a non-limiting example, a doublet phase function having a range of an optical power of—4 dpt to +4 dpt according to the disclosure, for example, the phase function of a static lens that may be formed of glass may provide, as a non-limiting example, a resultant optical power range of 0 to +8 dpt.

Figure 12:
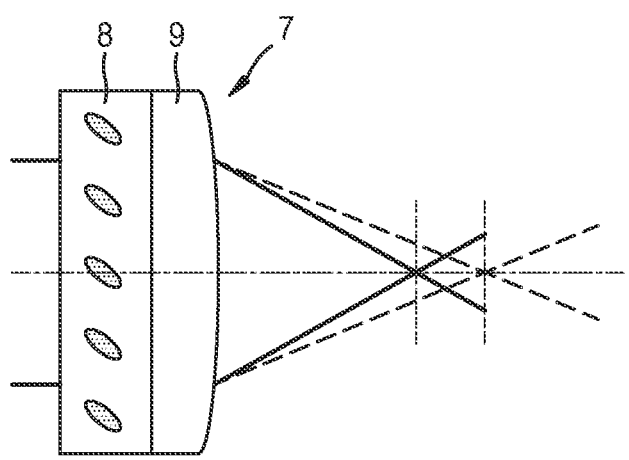
FIG. 12 schematically illustrates a structure of an optical system including an achromatic phase doublet according to an embodiment of the disclosure.

FIG. 12 schematically illustrates a structure of an optical system 7 including an achromatic phase doublet according to an embodiment of the disclosure.

Referring to FIG. 12, the optical system 7 may include an achromatic phase doublet 8 and a static lens 9. The achromatic phase doublet 8 may be implemented by a tunable electroactive lens having a doublet phase function. The achromatic phase doublet 8 may have a range of an optical power, for example, −4 dpt to +4 dpt. The static lens 9 may provide an additional optical power adjustment, for example, +4 dpt. Then, the optical system 7 may provide a range of a resultant optical power range of 0 to +8 dpt.

Alternatively, the static lens 9 may provide a negative (−) additional optical power adjustment. For example, the static lens 9 may provide an additional optical power adjustment, for example, −4 dpt. In this case, the optical system 7 may provide a resultant optical power range of −8 dpt to 0 dpt.

Figure 13:
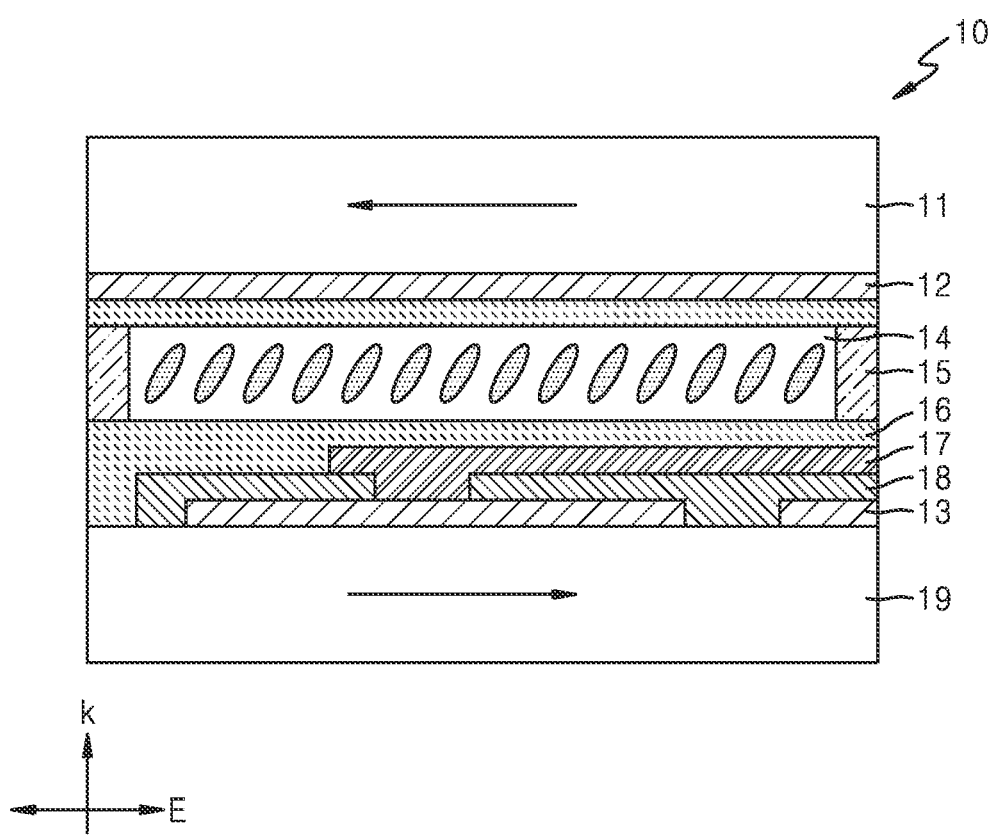
FIG. 13 schematically illustrates a structure of a tunable electroactive lens according to an embodiment of the disclosure.

FIG. 13 schematically illustrates a structure of a tunable electroactive lens according to an embodiment of the disclosure. A tunable electroactive lens 10 may be, as a non-limiting example, a tunable liquid crystal (LC) lens or a tunable polymer gel-based lens.

Referring to FIG. 13, the tunable electroactive lens 10 includes an upper substrate 11 and a lower substrate 19. According to the disclosure, the materials of the upper substrate 11 and the lower substrate 19 of the tunable electroactive lens 10 are selected from among transparent materials, as a non-limiting example, in a visible wavelength range, such as glass, plastic, or quartz. According to the disclosure, the thicknesses of the upper substrate 11 and the lower substrate 19 are within a range of 3 μm to 20 μm. The selection principles of substrate thickness based on specific substrate materials in a given implementation example of the disclosure are widely known in the technology field.

Furthermore, the tunable electroactive lens 10 includes an upper electrode 12 disposed on a lower surface of the upper substrate 11 and a lower electrode 13 disposed on an upper surface of the lower substrate 19. The upper electrode 12 is a ground electrode, and the lower electrode 13 is an electrode patterned to implement adjustments of an electroactive lens and an achromatic phase doublet, when a voltage is applied according to a "voltage map," as described above. The upper electrode 12 and the lower electrode 13 may include an appropriate transparent conductive material, in particular an indium-tin oxide (ITO), an indium oxide, a tin oxide, an indium-zinc oxide (IZO), an oxide zinc, and the like. As a non-limiting example, the upper electrode 12 and the lower electrode 13 may each have a thickness of about 30 nm to about 200 nm, and as a result, may optionally include many individual layers. The lower electrode 13 may have an electrode pattern having an appropriate shape, in particular a shape of concentric rings, strips, and the like.

The tunable electroactive lens 10 may include an electroactive material layer 14 disposed between the upper electrode 12 and the lower electrode 13. When the tunable electroactive lens 10 is a liquid crystal (LC) lens, the electroactive material layer 14 may be a liquid crystal layer. In other embodiments, for example, when the tunable electroactive lens 10 is a polymer gel-based lens, the electroactive material layer 14 may be polymer gel.

Furthermore, the tunable electroactive lens 10 may further include a spacer 15 that defines the thickness of the electroactive material layer 14, a supply (control) electrode 17 that connects the tunable electroactive lens 10 to a voltage supply portion, and an insulating layer 18. When the electroactive material layer 14 is a liquid crystal layer, the tunable electroactive lens 10 may further include an alignment layer 16 that aligns liquid crystals in the liquid crystal layer. For example, the spacer 15 may be formed of Mylar, glass, or quartz. The alignment layer 16 may be formed of, for example, polyvinyl alcohol (PVA), polyimide (PI), nylon 6,6, and the like. The supply (control) electrode 17 may be formed of, for example, aluminum, an indium-tin oxide, nickel, and other materials. The insulating layer 18 may be formed of, for example, a silicon dioxide.

Arrows in FIG. 13 indicate directions of polishing performed for the purpose of orienting/aligning liquid crystals in a cell. A reference sign k denotes a wave vector, and a reference sign E denotes a polarization state of incident optical radiation.

The tunable electroactive lens 10 may have a rectangular, circular, or any other appropriate aperture shape depending on the selected shape of the electrode pattern. The shape of a lens aperture portion may not be limited to circular and rectangular shapes, and furthermore, in particular, a rectangular, polygonal, or curved shape. In other words, according to the disclosure, it is noted that the aperture of the tunable electroactive lens 10 may have a shape that is determined by actual requirements for an optical system, a limit in the sizes of electrodes, a required shape and size, and the like.

A voltage applied to the electrodes 12 and 13 changes the orientation of liquid crystals in an embodiment having a tunable liquid crystal (LC) lens, or the orientation of polymer gel crystals in an embodiment of a polymer gel-based electroactive lens, and accordingly, a refractive index value is changed. According to the disclosure, as the electrodes 12 and 13 are arranged in the form of an electrode pattern on the substantially overall surface of the tunable electroactive lens 10 and a specific voltage is applied to each of the electrodes 12 and 13, a voltage profile ("voltage map") corresponding to a required phase profile of a tunable lens (which is an "achromatic phase doublet" according to the disclosure as described above) having a necessary optical power is generated accordingly. The voltage profile is converted to a phase profile using voltage-phase dependence (see FIG. 4), and the voltage-phase dependence is the characteristics of an optically active material (for more details, for example, see Chen R. H. Liquid Crystal Displays: Fundamental Physics and Technology. —John Wiley & Sons, 2011, or Den Boer W. Active Matrix Liquid Crystal Displays: Fundamentals and Applications. —Elsevier, 2011).

The electrodes 12 and 13 of the tunable electroactive lens 10 may include patterns of a shape appropriate for a special use of an optical system being discussed. In particular, the electrodes 12 and 13 may have a concentric, parallel strips, or polygonal array shape, or an irregular shape depending on a desired shape of image discretes. The selection of the shapes of the electrodes 12 and 13 is stipulated by, for example, the type of the tunable electroactive lens 10 to be generated with respect to a given embodiment.

The tunable electroactive lens 10 may be manufactured in a polarization dependent or polarization independent arrangement. Accordingly, for example, to generate the tunable electroactive lens 10 in which transmittance does not depend on the polarization of incident light, (to focus light having polarization in both of x and y directions), the electrodes 12 and 13 having a shape of parallel strips may be selected. Furthermore, to focus light having polarization in both of the x and y directions, concentric ring electrodes may also be selected. Furthermore, the selection of the configuration of the electrodes 12 and 13 may be stipulated by the necessity of reducing the thickness of an optical system (in this state, ring electrodes are selected) or simplifying the manufacturing of the electrodes 12 and 13 (in this state, strip electrodes are selected). Various means and methods for focusing polarized and non-polarized light are obvious to a person skilled in the art in the technical field to which the disclosure pertains. As an example, a method of focusing light is disclosed in a reference document, Sun Y. N., et al. Development of Liquid Crystal Adaptive Lens with Circular Electrodes for Imaging Application//Integrated Optics: Devices, Materials, and Technologies VII. —International Society for Optics and Photonics, 2003. —T. 4987. —C.209-220.

The tunable electroactive lens may include at least one tunable optical cell (or substantially configured with the cell). The tunable optical cells may have various configurations and may be arranged with each other in specific methods. Furthermore, when there is more than one tunable optical cell, the tunable optical cells may be connected to each other by a waveguide. In one of the non-limiting embodiments, the waveguide connects tunable electroactive lenses to a source of virtual images, and in another embodiment, the waveguide is arranged between a tunable electroactive lens directly coupled to the source of virtual images source and a tunable electroactive lens disposed in a real world side. The optical system arrangement may be particularly applied to AR systems that need to enable viewing of virtual images and observation of the real world with sufficient definition and without chromatic aberrations.

The optical device according to the disclosure, which includes at least one tunable electroactive lens capable of implementing the achromatic phase "doublet" described above, may be used in different optical devices and systems in which not only chromatic aberrations, in particular "positional chromatic aberration," may be removed or reduced (compensated for), but the thickness of a tunable electroactive lens and a response time of the lens may be reduced. As a non-limiting example, the optical device may be used in, for example, photo or video capturing systems, such as cameras of smartphones, tablets or other portable computers, or photo cameras used to generate, by a tunable electroactive lens, images having reduced chromatic aberrations, on a sensor of the capturing system.

Other possible application fields of the optical device according to the disclosure relate to multifocal glasses for correcting a user's vision that can be used in the structure of the glasses for the user to see the real world while the tunable electroactive lens compensates for the refractive error of one or both eyes of the user. In this case, the optical power value of the implemented electroactive lens is corrected by a refractive error value of the user's eyes.

One or more possible application fields of the optical device according to the disclosure are AR/virtual reality (VR) systems in which images from the display (when the disclosure is implemented in a VR system) are transferred to the user's eyes while removing or reducing chromatic aberrations through a tunable electroactive lens, or the user sees the real world overlaid with AR images in the AR system. In this state, in the AR system according to the disclosure, the optical device may be used with or without correcting the refractive error of the user's eyes.

Figure 14:
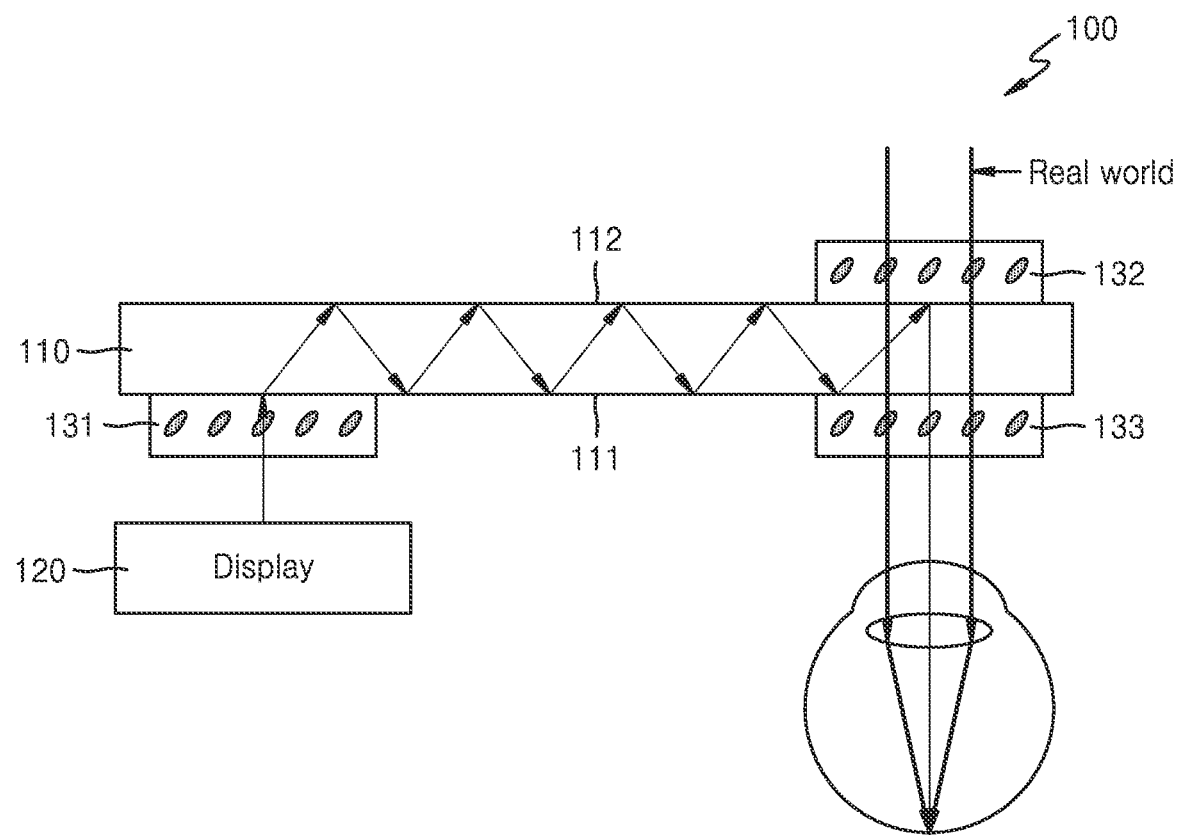
FIG. 14 schematically illustrates an augmented reality (AR) system including a tunable electroactive lens according to an embodiment of the disclosure.

FIG. 14 schematically illustrates an AR system including a tunable electroactive lens according to an embodiment of the disclosure.

Referring to FIG. 14, an AR system 100 may include a waveguide 110, a display 120 disposed facing an one side edge of a first surface 111 of the waveguide 110, and a plurality of achromatic phase doublets 131, 132, and 133. For example, the first achromatic phase doublet 131 may be disposed between the first surface 111 of the waveguide 110 and the display 120. The first achromatic phase doublet 131 may be disposed, for example, on the first surface 111 of the waveguide 110 in contact therewith. Furthermore, the second achromatic phase doublet 132 may be disposed at the other side edge of a second surface 112 that is the opposite side of the first surface 111 of the waveguide 110, and the third achromatic phase doublet 133 may be disposed at the other side edge of the first surface 111 of the waveguide 110. For example, the second achromatic phase doublet 132 may be disposed in contact with the second surface 112 of the waveguide 110, and the third achromatic phase doublet 133 may be disposed in contact with the first surface 111 of the waveguide 110. The second achromatic phase doublet 132 and the third achromatic phase doublet 133 may be disposed facing each other with the waveguide 110 therebetween.

In the structure, a virtual image displayed on the display 120 may be transferred to a user's eye through the first achromatic phase doublet 131, the waveguide 110, and the third achromatic phase doublet 133. Furthermore, the landscape of the real world may be transferred to the user's eye through the second achromatic phase doublet 132, the waveguide 110, and the third achromatic phase doublet 133.

The AR system 100 may operate in two different modes. In a first mode, the first achromatic phase doublet 131 may be used to convert a virtual image with an optical power that is corrected by the value of the refractive error of the user's eyes caused by presbyopia, myopia, and the like. The second achromatic phase doublet 132, and also the third achromatic phase doublet 133 if necessary, may be used to compensate for the refractive error of the user's eyes when observing the real world through the AR system 100.

In a second mode, the AR system 100 operates without correcting the refractive error of the user's eyes (when a user has a corrected vision), whereas the second achromatic phase doublet 132 compensates for the optical power induced by the third achromatic phase doublet 133, which may move, as a result, the virtual image from the display 120 to the user's eye through the waveguide 110.

A person skilled in the art in the technical field may understand that the above description and drawings show only some of the possible examples of techniques, materials, and technical means in which embodiments of the disclosure may be implemented. The detailed descriptions of the embodiments provided above are not intended to limit or define the legal protection scope of the disclosure.

Other embodiments to be included in the scope of the disclosure may arise to a person skilled in the arts in the technical field after careful reading of the detailed description section provided above with reference to the accompanying drawings, and all such apparent modifications, changes, and/or equivalent substitutes are considered to be within the scope of the disclosure. All the related-art technology reference documents cited and discussed in the specification are incorporated by reference in the disclosure where applicable.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An optical device comprising:
an electroactive lens including an electroactive material layer,
wherein the electroactive lens is configured to form a doublet phase function by applying a voltage to the electroactive material layer, and
wherein the doublet phase function comprises a kinoform phase function and a harmonic lens phase function.

2. The optical device of claim 1, wherein the harmonic lens phase function is an integer multiple of the kinoform phase function.

3. The optical device of claim 2,
wherein the kinoform phase function is a phase function having a maximum phase of $2\pi$ radians,
wherein the harmonic lens phase function is a phase function having a maximum phase of $2\pi N$, N being an integer of 2 or more, and
wherein the doublet phase function is formed by a combination of the kinoform phase function and the harmonic lens phase function and is a phase function having a maximum phase of $2\pi + 2\pi N$.

4. The optical device of claim 3,
wherein N is an integer of 2 to rounded downward ($kt\Delta n/2\pi - 1$),
wherein k is a wave number,
wherein t is a lens thickness, and $\Delta n$ is optical anisotropy.

5. The optical device of claim 1,
wherein the electroactive lens is a tunable electroactive lens, and
wherein the electroactive lens is configured to adjust a focal length by changing a voltage applied to the electroactive material layer of the electroactive lens.

6. The optical device of claim 5, wherein the electroactive lens is a liquid crystal (LC) lens.

7. The optical device of claim 5, wherein the electroactive lens is a polymer gel-based lens.

8. The optical device of claim 1,
wherein the electroactive material layer comprises a plurality of independent cells stacked in an optical propagation path, and
wherein each of the plurality of independent cells has a phase function amplitude of $2\pi$.

9. The optical device of claim 8,
wherein the electroactive lens comprises:
a first electroactive lens that reproduces the kinoform phase function; and
a second electroactive lens that reproduces the harmonic lens phase function, and
wherein the first electroactive lens and the second electroactive lens are arranged along the optical propagation path without an interval therebetween.

10. The optical device of claim 1, further comprising a static lens,
wherein the electroactive lens is configured to reproduce any one of the kinoform phase function and the harmonic lens phase function, and
wherein the static lens is configured to reproduce the other of the kinoform phase function and the harmonic lens phase function.

11. The optical device of claim 1, further comprising a static lens that provides an additional optical power adjustment.

12. An augmented reality system comprising:
a waveguide;
a display disposed to face one side edge of a first surface of the waveguide;
a first achromatic phase doublet disposed between the first surface of the waveguide and the display;
a second achromatic phase doublet disposed at the other edge of a second surface opposite to the first surface of the waveguide; and
a third achromatic phase doublet disposed to face the second achromatic phase doublet with the waveguide therebetween,
wherein the first achromatic phase doublet and the second achromatic phase doublets comprise the optical device of claim 1.

13. A method of driving the optical device of claim 1 having reduced chromatic aberrations, the method comprising:

obtaining an optical power of a kinoform;
obtaining an optical power of a harmonic lens;
obtaining a kinoform phase function having a maximum phase of 2π radians;
obtaining a harmonic lens phase function having a maximum phase of 2πN radians, wherein N is an integer greater than 1;
combining the harmonic lens phase function with the kinoform phase function to obtain a doublet phase function; and
applying a voltage to the electroactive material layer of the electroactive lens to implement the doublet phase function.

14. The method of claim 13, wherein N is an integer of 2 to rounded downward integer (ktΔn/2π−1), k is a wave number, t is a lens thickness, and Δn is optical anisotropy.

15. A computer-readable medium storing instructions which, when executed by a processor, cause the processor to perform a method of driving the optical device of claim 1 having reduced chromatic aberrations, the method comprising:
obtaining an optical power of a kinoform;
obtaining an optical power of a harmonic lens;
obtaining a kinoform phase function having a maximum phase of 2π radians;
obtaining a harmonic lens phase function having a maximum phase of 2πN radians, wherein N is an integer greater than 1;
combining the harmonic lens phase function with the kinoform phase function to obtain a doublet phase function; and
applying a voltage to the electroactive material layer of the electroactive lens to implement the doublet phase function.

* * * * *